United States Patent Office 3,274,830
Patented Sept. 27, 1966

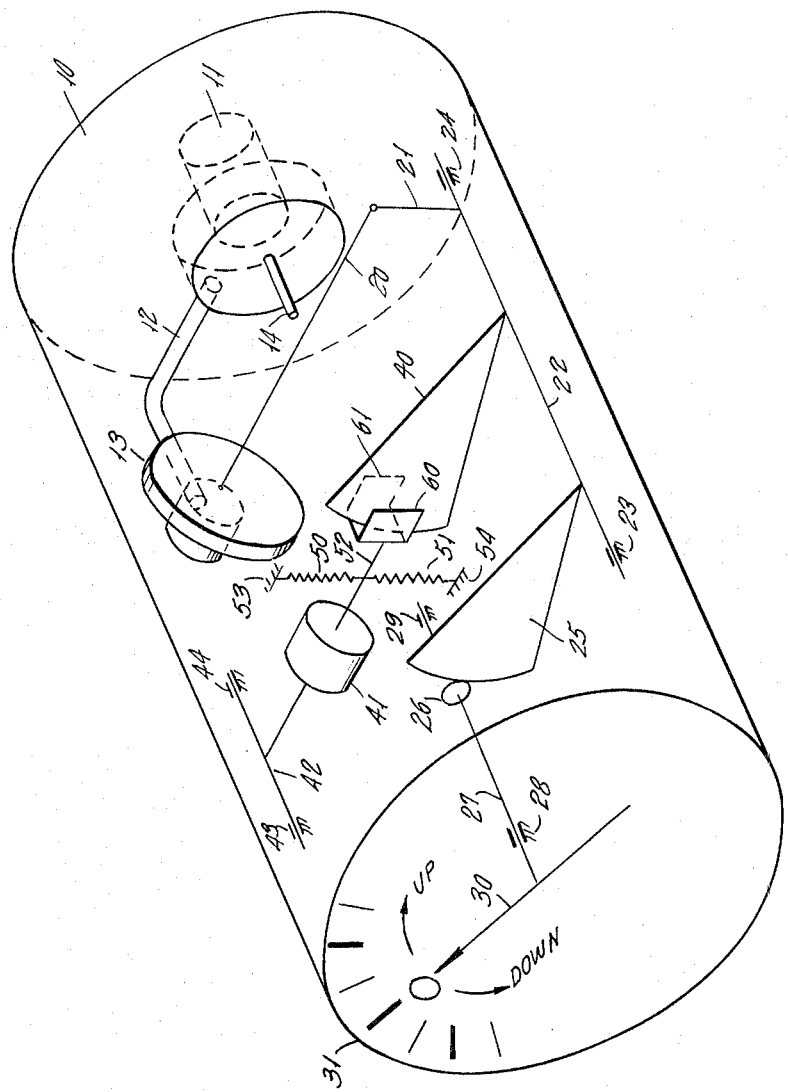

3,274,830
VERTICAL VELOCITY INDICATOR
Walter Angst, Douglaston, N.Y., assignor to Kollsman Instrument Corporation, Elmhurst, N.Y., a corporation of New York
Filed Feb. 18, 1964, Ser. No. 345,672
4 Claims. (Cl. 73—179)

This invention relates to vertical speed indicators and more specifically relates to a vertical speed indicator having rapid response. This application is an improvement of the device shown in my copending application Serial No. 321,541, filed November 5, 1963, and entitled "Vertical Velocity Indicator."

In the foregoing application, rapid response was obtained through the provision of an inertial mass which is connected to the main indicator through an auxiliary compensating diaphragm.

The principle of the present invention is to connect an inertial mass directly to the indicator mechanism through an intermediary linkage which includes a viscous medium for connecting a first member to a second member. Thus, the two members connected by the viscous medium will be connected through the cohesive forces of the medium and will move together when one of the members is rapidly moved, but will be virtually disconnected for relatively slow movement of one of the members.

Accordingly, a primary object of this invention is to provide a novel vertical velocity indicator having rapid response.

Another object of this invention is to provide a novel vertical velocity indicator which has compensation means therein for extreme vertical acceleration whereby a lagging reading is avoided under extreme acceleration conditions.

Still another object of this invention is to provide a novel connection between a compensating mechanism and an indicating mechanism which includes a connection through a viscous material.

These and other objects of the invention will become apparent from the drawing which schematically illustrates, in perspective view, a vertical velocity indicator having the compensating mechanism of the present invention.

Referring now to the drawing, I have schematically illustrated a standard type of indicator which includes a housing 10 having a suitable connection means 11 for the reception of a static pressure measuring conduit, such as conduit 12 which is connected to the interior of the rate diaphragm 13. The pressure connection means 11 also includes a capillary conduit or opening 14 through which the interior of housing 10 and thus the exterior of rate diaphragm 13 is connected. In this regard, the arrangement is similar to that shown in my above noted copending application Serial No. 321,541, and is a standard arrangement.

Thus as the altitude of an aircraft varies, the static pressure applied to conduit 12 will similarly vary. The change in the exterior pressure of rate diaphragm 13, however, will not vary as quickly as the interior pressure of diaphragm 13 because of the restrictive capillary 14. Therefore, during ascent and descent the pressure differential across rate diaphragm 13 will vary so that it will extend or contract to deliver an indication of the rate of change of altitude.

Once the aircraft assumes a constant altitude, the pressure on the interior of casing 11 will become equalized through capillary 14 to the static pressure on the interior of conduit 12 and within diaphragm 13 so that a zero reading is obtained.

The output of diaphragm 13 is pivotally connected by a suitable link 20 to crank arm 21 of the main rocking shaft 22 which is carried in stationarily positioned bearings 23 and 24. The main rocking shaft 22 is then directly connected to a sector gear 25 in the usual manner where the sector gear 25 meshes with gear 26 on handstaff 27 which is rotatably mounted in fixed bearings 28 and 29. The handstaff 27 is then directly connected to a pointer 30, or other similar indicating device, which sweeps with respect to calibrated dial surface 31 in the usual manner.

All of the structure described to this point is of the common well-known type. In accordance with the present invention, a compensating mechanism is provided which includes a drag plate sector 40 which is directly secured to the main rocking shaft 22. An inertial mass 41 is then directly secured to a rotatable shaft 42 which is carried in fixed bearings 43 and 44 whereby the inertial mass 41 is rotatable in a plane perpendicular to the axis of casing 10. Note that the casing 10 is mounted in the aircraft in such a manner that its axis is perpendicular to the vertical.

The inertial mass 41 is then held in some predetermined central position by means of opposing tension springs 50 and 51 whose adjacent ends are secured to link 52. Link 52 is rigidly carried from inertial mass 41. The other ends of springs 50 and 51 are fixed to stationary support portions 53 and 54 respectively within the casing 10. The end of link 52, which is a rigid member, is then bifurcated into sections 60 and 61 which define parallel spaced plates which receive the end of drag plate 40 which lies in a plane parallel to the plane of members 60 and 61. It is to be noted that there is no physical contact between drag plate 40 and bifurcated sections 60 and 61.

In accordance with the invention, the opposing spaced surfaces of plate 60 and drag plate 40 and of plate 61 and drag plate 40 are preferably spaced by the order of 0.010 inch. This space is then filled with a suitable silicone oil having a viscosity of the order of 150,000 centistokes, the silicone oil between the opposing plate surfaces being held therein by capillary action. This oil will then define a viscous drag connection between link 52 and rocking shaft 22 whereby rapid motion of inertial mass 41 will be transmitted as a force to plate 40 so that this rapid motion will be transmitted to rocking shaft 22 and thus pointer 30 independently of the differential pressure on rate diaphragm 13. The rate diaphragm 13, which normally has relatively slow response, will then eventually catch up to this reading by virtue of the slower appearance of suitable differential pressure across the diaphragm walls.

Thus, in operation and during ascent the diaphragm 13 will be compressed, first due to the reaction of inertial mass 41, and is then sustained by the built up differential pressure. Just the opposite operation will occur on descent.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A vertical velocity indicator comprising, in combination, pressure-transducer means for measuring a change in static pressure, indicator means for indicating vertical velocity, linkage means for connecting said pressure transducer means to said indicator means, and compensation means operatively connected to said indicator means; said compensation means including means for measuring vertical acceleration and deceleration of said indicator; said compensator means including auxiliary linkage means connected to said indicator means for adjusting the indication of said indicator means in accordance with the lag of said pressure transducer; said auxiliary linkage means including a first and second link connected through a film of viscous material.

2. The device substantially as set forth in claim 1 wherein said compensation means includes an inertial mass for responding to vertical acceleration.

3. The device substantially as set forth in claim 1 wherein said first link has a bifurcated end; said second link having a portion thereof being positioned within the space defined by said bifurcated end of said first link and being spaced from the opposing walls of said bifurcated end.

4. The device substantially as set forth in claim 3 wherein the space between said bifurcated end of said first link and said portion of said second link is filled with said viscous material; said viscous material being held in said space by capillary forces.

References Cited by the Examiner
UNITED STATES PATENTS 2,751,785   6/1956   Fowler et al. _____ 73—179

LOUIS R. PRINCE, *Primary Examiner.*